Oct. 11, 1938.  R. B. ELMER  2,132,939
CONSTRUCTION OF WATER COOLING TOWERS
Filed Oct. 20, 1937   6 Sheets-Sheet 1
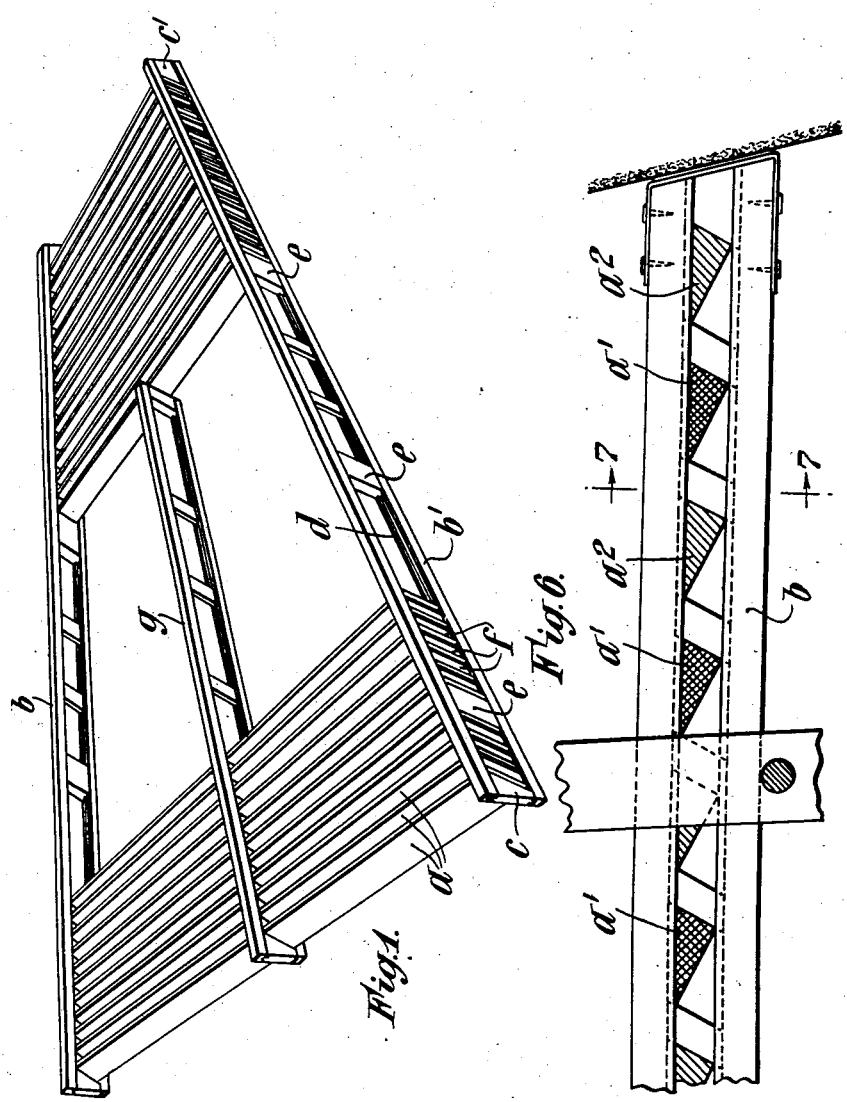
Inventor:
Robert Benjamin Elmer,
By his Attorneys,
Fraser, Myers & Manley

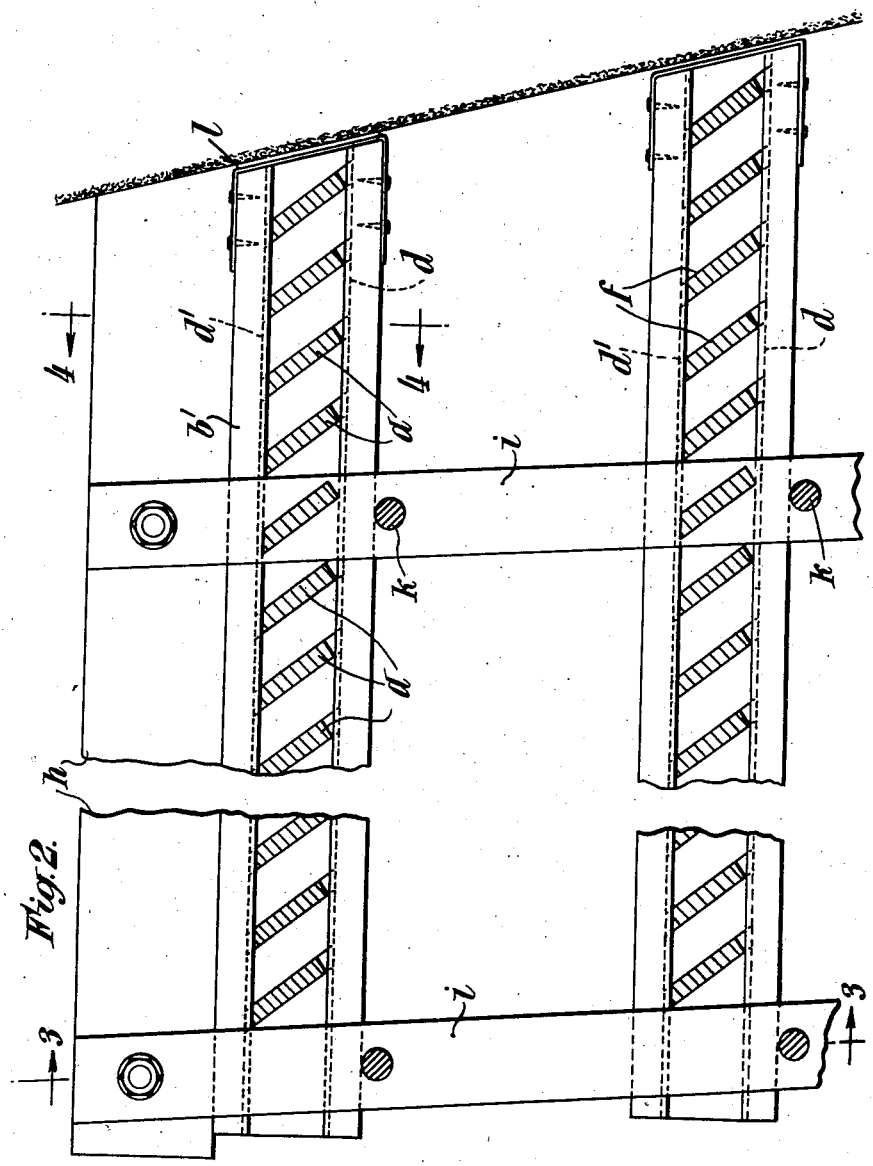

Oct. 11, 1938.    R. B. ELMER    2,132,939
CONSTRUCTION OF WATER COOLING TOWERS
Filed Oct. 20, 1937    6 Sheets-Sheet 3
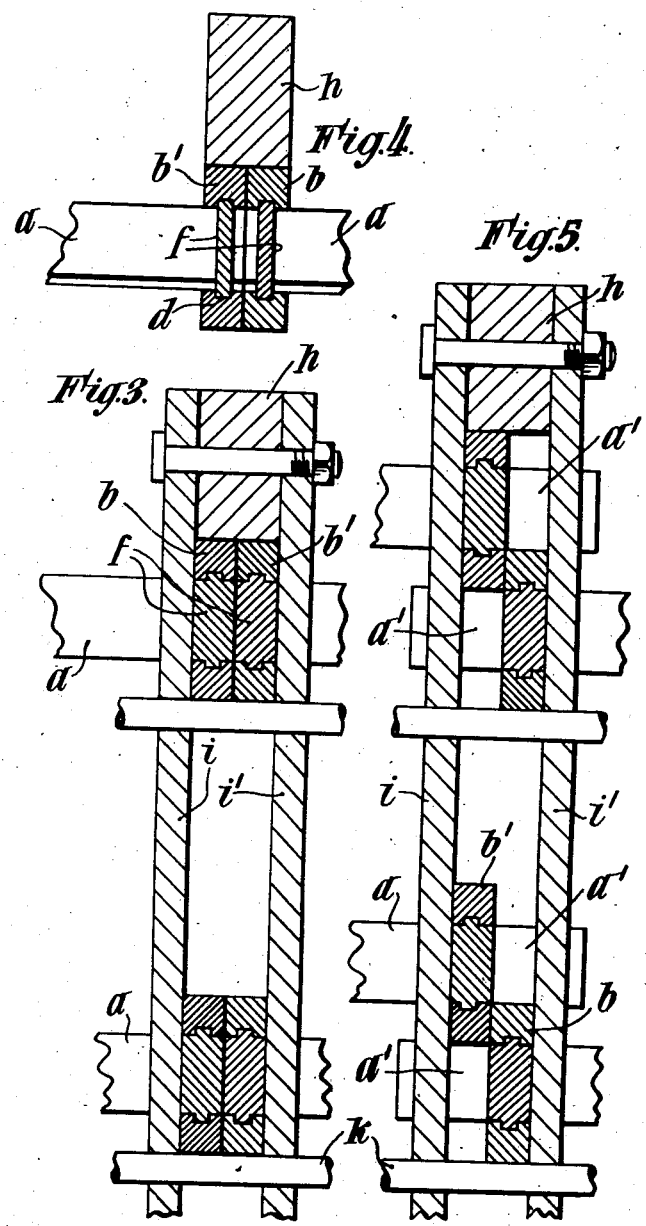
Inventor:
Robert Benjamin Elmer,
By his Attorneys,
Fraser, Myers & Manley

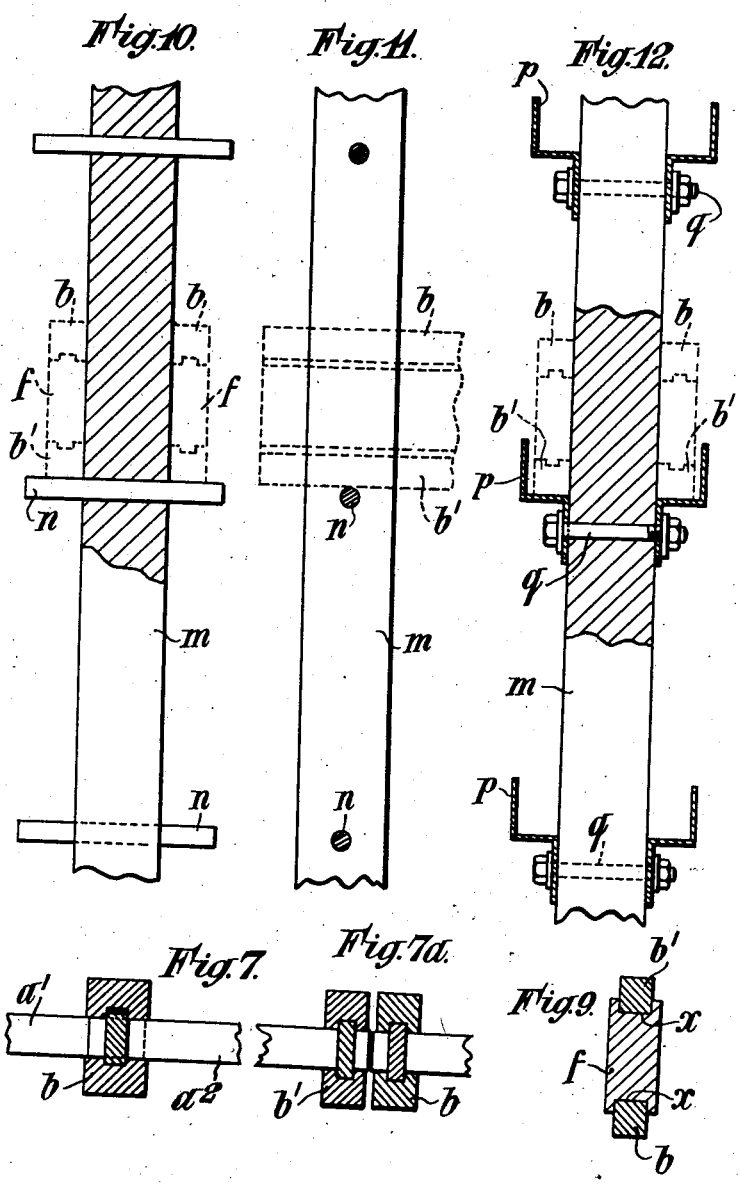

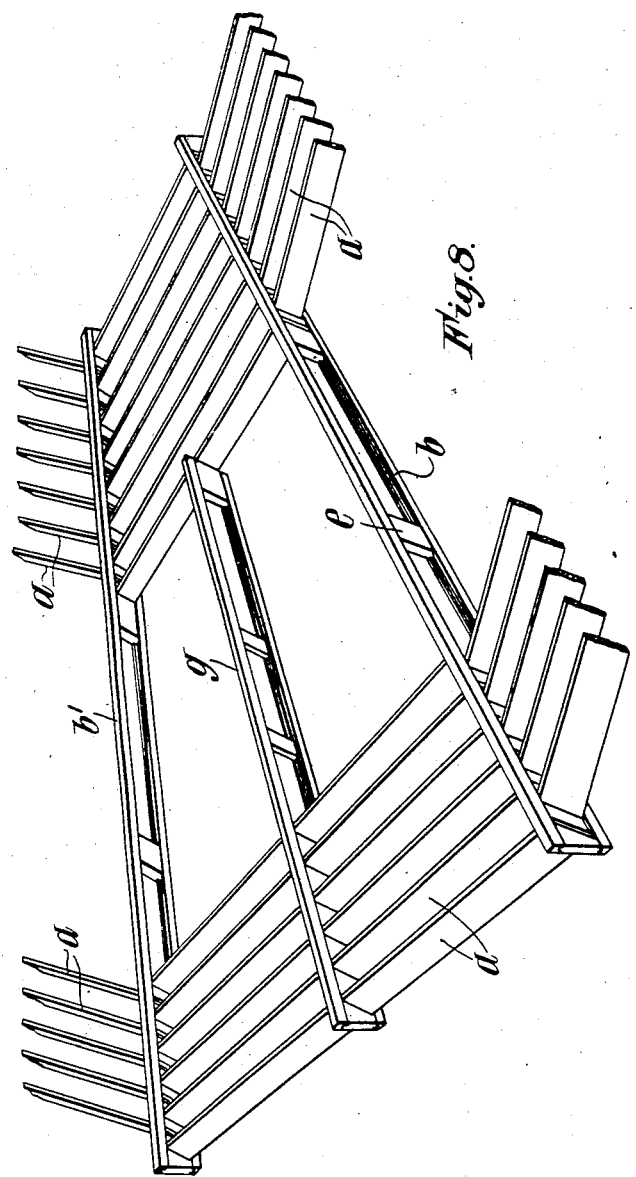

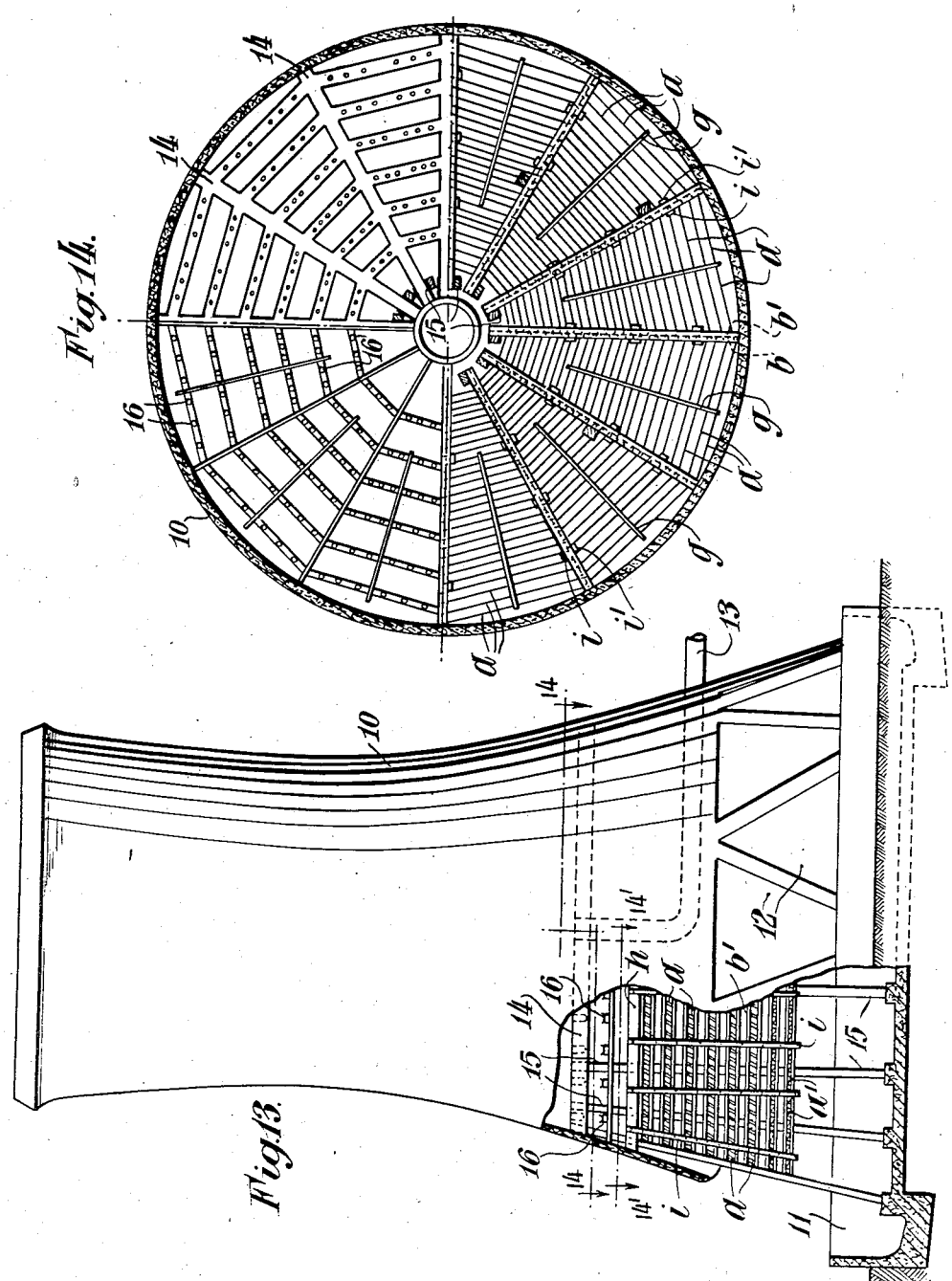
Oct. 11, 1938.  R. B. ELMER  2,132,939
CONSTRUCTION OF WATER COOLING TOWERS
Filed Oct. 20, 1937  6 Sheets-Sheet 6
Inventor:
Robert Benjamin Elmer,
By his Attorneys,
Fraser, Myers & Manley Patented Oct. 11, 1938

2,132,939

UNITED STATES PATENT OFFICE 2,132,939

CONSTRUCTION OF WATER COOLING TOWERS

Robert Benjamin Elmer, Westminster, London, England, assignor of two-thirds to L. G. Mouchel and Partners, Limited, Westminster, London, England, a British company and Pierre Joseph Gerard, Westminster, London, England Application October 20, 1937, Serial No. 169,954
In Great Britain October 28, 1936

9 Claims. (Cl. 261—108)

This invention relates to the construction of water cooling towers.

In the construction of cooling towers as hitherto carried out it has been usual to carry the irrigation system on posts anchored at the bottom of the pond. The irrigation system comprises main water distributing troughs or pipes and a large number of baffles or louvers carried below the main water troughs on which the water falling from the distributing troughs splashes and forms spray for more efficient cooling. These louvers are in turn carried on bearers or lattice work carried on the main posts. The supports carrying the louvers may be braced by bracing members.

Hitherto these louvers have all been individually nailed or otherwise secured on to their supports and this operation is lengthy and requires the use of skilled labour. The object of the present invention is to provide an economy in the construction of the internal irrigation system and to permit the use of relatively unskilled labour.

According to the present invention the louvers of the irrigation system are mounted between side frames and are held in position in spaced relationship by means of distance pieces also inserted in the side frames. In this way a number of louvers may be assembled as a unit which can be erected or dismantled as a whole.

The louvers may be mounted in the side frames so that the assembly of louvers and frames forms a unit which can be built as such into the irrigation system of the tower, or the side frames may be first erected in position in the tower and the louvers then subsequently mounted in the side frames.

The distance pieces may be shaped and fitted so as to hold the louvers in the desired spaced relationship and at the required inclination.

The side frames may be rectangular, having two long sides, and the distance pieces are so shaped that they can be introduced and slidden between the long sides of the frame.

The inner opposing edges of the long sides of the frame may have grooves in which the top and bottom edges of the distance pieces can engage, or, alternatively, the top and bottom edges of the distance pieces may be grooved to engage the inner opposing edges of the long sides of the frame.

The louver assemblies may be supported in vertically spaced rows in the tower on supporting posts, which are in turn supported on main supports.

The supporting posts may be arranged in pairs connected together at intervals by removable pins, the louver assemblies being carried directly on said pins.

The invention will be illustrated by way of example with reference to the accompanying drawings, wherein:

Fig. 1 is a perspective view of a partly assembled unit;

Fig. 2 is a vertical detail view showing the method of supporting the units in position in a water cooling tower;

Fig. 3 is a section on line 3—3, Fig. 2;

Fig. 4 is a section taken on line 4—4, Fig. 2;

Fig. 5 is a section similar to Fig. 3 of a somewhat modified arrangement;

Fig. 6 illustrates the different construction of louvers in the lowermost series in the tower;

Fig. 7 is a section taken on line 7—7, Fig. 6;

Fig. 7a illustrates a modification of Fig. 7;

Fig. 8 is a perspective view illustrating a modified method of assembling the louvers;

Fig. 9 is a detail view illustrating a modification;

Figs. 10 and 11 are detail views illustrating a constructional modification of the supporting posts;

Fig. 12 is a further detail view of another modification of a supporting post;

Fig. 13 illustrates an elevation of a water cooling tower, part of the wall of which is broken away to disclose details of the interior construction;

Fig. 14 is a cross section to an enlarged scale taken partly on line 14—14 and partly on line 14'—14', Fig. 13.

According to Fig. 1 the louvers $a$ are built up into units of substantially truncated sector-shape of which the side frames $b$, $b^1$ for the louvers form the radii, disposed, when the units are in position in the tower, radially in the tower. The side frames $b$, $b^1$ are rectangular and are closed at the ends by distance pieces $c$, $c^1$ which are screwed or otherwise secured in position. Fixed distance pieces $e$ are screwed in position at intervals intermediate the end pieces $c$, $c^1$ and act as struts or stays. The ends of the louvers $a$ are introduced between these frames and are held in position therein by means of distance pieces $f$ the top and bottom edges of which engage in grooves $d$, $d^1$ formed respectively in the inner opposing edges of the frames $b$, $b^1$. These distance pieces $f$ are in the form of parallelepipedons having the ends inclined at an acute angle to the base corresponding to the inclination to the vertical which the baffles are to take up when inserted in the frames. This, the louvers are readily positioned between the side frames by inserting the ends of each louver in the side frames and then introducing a distance piece $f$ after each louver, the distance pieces serving to impart the correct inclination to the louvers and also to hold them securely in the side frames. A stiffener $g$ comprising a rectangular frame similar to the frames $b, b^1$ is disposed transversely to the louvers to strengthen the structure and/or to connect together some or all the louvers in one unit. This stiffener $g$ is shown as extending only for part of the length of the unit but may extend the whole length of the unit. The louvers $a$ are passed through and secured in the stiffener $g$ by distance pieces in the same way as in the side frames $b, b^1$. The upper edges of the louvers are shaped so that when in position in the tower they present a substantially horizontal surface to the falling water drops, as is clearly shown in Fig. 2.

Additional strength may be imparted to the unit by disposing a strengthening member (not shown) between the supports and parallel to the louvers.

Fig. 2 is a detail illustrating how the louver-like assemblies of Fig. 1 are connected together in vertical spaced relationship in the water cooling tower. Beams $h$ extending radially across the tower and supported by the shell of the tower and, if desired, also by posts (not shown) anchored at the bottom of the tower serve to support vertical spacing posts $i$ on which the unit assemblies are carried. The arrangement is shown more clearly in Fig. 3, in which figure the posts $i$ are shown as comprising two separate posts $i, i'$ bolted at top on opposite sides of the beam $h$ and having apertures at spaced vertical intervals through which pins $k$ are loosely passed so as to be capable of easy withdrawal and replacement. Two rectangular frames of adjacent unit assemblies are disposed between the posts $i, i'$ and are carried on these pins $k$. Only two rows of unit assemblies are shown in Figs. 2 and 3, but it will be understood that a large number of such rows are built up in the interior of the tower. Fig. 4 illustrates a section taken on the line 4—4 of Fig. 2 and shows the louvers of two adjacent assemblies extending in opposite directions and also shows the distance pieces $f$ between each pair of louvers engaging in the grooves $d, d^1$ of the frame members.

The end of the unit assembly which abuts against the shell of the tower is preferably shaped to conform with the contour of the tower and is secured in position by a copper strip $l$ (Fig. 2) which is screwed at top and bottom to the side members of the frame. This arrangement enables the outermost louver to be placed very close to the shell of the tower.

If desired a number of radial supporting beams such as $h$ may be provided at vertically spaced intervals and the vertical spacing posts $i$ may be in lengths connected between these various beams.

In a modification the unit assemblies of louvers and side frames may be supported by the main posts which normally support the distribution troughs, transverse beams and the like. In this modification the unit assemblies would be supported between two main posts and the superposed rows of units would be spaced vertically by means of packing pieces, distance members, bolts or the like.

In the arrangement shown in Figs. 1 to 4 the adjacent side frames of adjacent units are disposed in the same horizontal plane. This arrangement requires a cutting of the louvers into lengths which are fairly accurately predetermined. In order to avoid this necessity and to permit louvers to be employed which need not be cut so accurately the adjacent side frames of adjacent units may be disposed below one another. Such an arrangement is shown in Fig. 5. From this figure it will be evident that the ends $a^1$ of the louvers $a$ in both the adjacent side frames may project freely.

The lowest rows of louvers of the stack may be of triangular shape, as is usual in water cooling towers. These lower triangular louvers may also be carried in frames which are similar to those above described. Triangular louvers in the lower rows are illustrated in Figs. 6 and 7 and are denoted by the reference letter $a^2$.

In the construction shown in Figs. 1 to 5 each assembly of louvers is carried between two frames $b, b^1$. This arrangement enables the louvers to be pre-assembled in the side frames so that the unit thus formed can be placed complete into the irrigation system. The arrangement of the triangular louvers shown in Figs. 6 and 7 is somewhat different. Here adjacent ends of two oppositely directed series of louvers $a^1$, $a^2$ are mounted in a single frame $b$ as can be seen clearly in Fig. 7. It is to be understood, however, that these triangular louvers can also be carried in separate frames $b, b^1$, as shown in Fig. 7a.

The louvers shown in Figs. 1 to 5 can also be mounted in the manner shown in Fig. 7, as will now be described with reference to Fig. 8. According to this figure the frames $b, b^1$ are first mounted by themselves on the supports in the tower.

The louvers are then assembled in the frames as shown, with the aid of distance pieces as above described, the ends of adjacently disposed louvers being positioned in one frame.

In the arrangements above described the distance pieces $f$ fit into grooves in the rectangular frames. This arrangement may be reversed as shown in Fig. 9 in which figure the distance pieces $f$ are shown with grooves $x$ engaged by the longitudinal edges of the side frames.

In the modified form of supporting posts shown in Figs. 10 and 11 single posts $m$ are used. These posts $m$ are similarly provided with apertures at vertical intervals to receive timbre pins $n$ on which the supporting frameworks $b, b^1$ are carried.

The construction shown in Figs. 10 and 11 is again modified in the form shown in Fig. 12. In this figure metal brackets $p$ are bolted at vertical intervals to the posts $m$ by means of bolts $q$. In this modification the frames $b, b^1$ are carried in the brackets $p$.

Figs. 13 and 14 illustrate a water cooling tower in which the irrigation system comprises louvers mounted between side frames according to the invention. It is to be understood that Figs. 13 and 14 are not drawn to scale and are only diagrammatic in order to illustrate the general arrangement. For example, a greater number of rows of louvers would be provided in an actual tower; the rows of louvers shown in Fig. 13 are limited in order to make the general arrangement clearer. In Fig. 13, 10 is the shell of the tower made of reinforced concrete erected over the cooling pond 11 and provided near its base with air inlets 12. The water to be cooled is led through the shell of the tower at 13 and centrally upwards into the main distribution troughs 14 which are supported by the main posts 15. The bottoms of these troughs are provided with a series of apertures through which the water can drop on to the splash cups 16 beneath the troughs 14, and thence on to the system of louvers disposed below. These louvers are shown in the bottom half of Fig. 14 and are denoted by the reference letter $a$, the method here adopted of assembling the louvers being as described with reference to Fig. 8. The lowermost series of louvers are denoted in Fig. 13 by the reference letter $a'$ and are of triangular section as described in Fig. 6.

It will be understood that as the water falls on to the successive rows of inclined louvers it is progressively deflected by reason of the inclination of the louvers outwards towards the shell of the tower.

What I claim and desire to secure by Letters Patent is:—

1. In a water cooling tower a cooling stack comprising a plurality of pairs of side frames extending across the tower, a plurality of layers of louvers the end portions of which extend respectively into openings in the side frames, each pair of which is designed to accommodate one layer of louvers, and distance pieces adapted to be inserted in said openings and to engage said louvers whereby to hold the latter in the desired inclined position in spaced relationship between the side frames.

2. In a water cooling tower according to claim 1, the said side frames comprising upper and lower longitudinal bars in spaced relationship having grooves in their opposing edges in which the top and bottom edges of the distance pieces can engage.

3. In a water cooling tower according to claim 1, the said side frames comprising upper and lower longitudinal bars in spaced relationship and distance pieces, the top and bottom edges of which are grooved to engage the inner opposing edges of the said bars.

4. In a water cooling tower according to claim 1 means for stiffening the layers of louvers comprising stiffening members extending longitudinally of each layer of louvers and between the side frames.

5. In a water cooling tower according to claim 1 supporting posts for the louvers and side frames of the cooling stack and main supports for the supporting posts.

6. In a water cooling tower a cooling stack comprising a plurality of pairs of side frames extending across the tower, a plurality of layers of louvers the end portions of which extend respectively into openings in the side frames each pair of which is designed to accommodate one layer of louvers, thus providing a plurality of louver assemblies, distance pieces adapted to engage in said openings in the side frames and to engage said louvers whereby to hold the latter in the desired inclined position in spaced relationship between the side frames, supporting posts for the louver assemblies, means for supporting the louver assemblies in vertically spaced rows on the supporting posts, and main supports for the supporting posts.

7. In a water cooling tower a cooling stack comprising a plurality of pairs of side frames extending across the tower, a plurality of layers of louvres the end portions of which extend respectively into openings in the side frames, each pair of which is designed to accommodate one layer of louvers, thus providing a plurality of louver assemblies, stiffening members for the louvers extending longitudinally of each layer of louvers and between the side frames, distance pieces adapted to engage in said openings in the side frames and to engage said louvers whereby to hold the latter in the desired inclined position in spaced relationship between the side frames, supporting posts for the louver assemblies, means for supporting the louver assemblies in vertically spaced rows on the supporting posts, and main supports for the supporting posts.

8. In a water cooling tower a cooling stack comprising a plurality of pairs of side frames extending across the tower, a plurality of layers of louvers the end portions of which extend respectively into openings in the side frames each pair of which is designed to accommodate one layer of louvers, thus providing a plurality of louver assemblies, distance pieces adapted to engage in said openings in the side frames and to engage said louvers whereby to hold the latter in the desired inclined position in spaced relationship between the side frames, supporting posts for the louver assemblies arranged in pairs, pins passed through apertures in the pairs of supporting posts on which the louver assemblies are directly supported in vertically spaced rows, and main supports for the supporting posts.

9. In a water cooling tower a cooling stack comprising a plurality of pairs of side frames extending across the tower, a plurality of layers of louvers the end portions of which extend respectively into openings in the side frames, each pair of which is designed to accommodate one layer of louvers, thus providing a plurality of louver assemblies, distance pieces adapted to engage in said openings in the side frames and to engage said louvers whereby to hold the latter in the desired inclined position in spaced relationship between the side frames, supporting posts for the louver assemblies, brackets carried on opposite sides of the supporting posts for supporting the louver assemblies in vertically spaced rows on the supporting posts, and main supports for the supporting posts.

ROBERT BENJAMIN ELMER.